(12) United States Patent
Stirbu

(10) Patent No.: US 7,246,236 B2
(45) Date of Patent: *Jul. 17, 2007

(54) METHOD AND APPARATUS FOR PROVIDING PEER AUTHENTICATION FOR A TRANSPORT LAYER SESSION

(75) Inventor: Vlad Alexandru Stirbu, Tampere (FI)

(73) Assignee: Nokia Corporation, Espoo (FI)

( * ) Notice: Subject to any disclaimer, the term of this patent is extended or adjusted under 35 U.S.C. 154(b) by 818 days.

This patent is subject to a terminal disclaimer.

(21) Appl. No.: 10/127,339

(22) Filed: Apr. 18, 2002

(65) Prior Publication Data

US 2003/0200431 A1 Oct. 23, 2003

(51) Int. Cl.
*H04L 9/00* (2006.01)
*H04K 1/10* (2006.01)

(52) U.S. Cl. ............... 713/168; 713/151; 713/155; 713/160; 380/33

(58) Field of Classification Search ............... None
See application file for complete search history.

(56) References Cited

U.S. PATENT DOCUMENTS

| 5,150,411 | A |   | 9/1992 | Maurer et al. |   |
|---|---|---|---|---|---|
| 5,802,178 | A | * | 9/1998 | Holden et al. | 713/151 |
| 6,915,437 | B2 | * | 7/2005 | Swander et al. | 713/171 |
| 2001/0005883 | A1 | * | 6/2001 | Wray et al. | 713/151 |
| 2001/0023482 | A1 | * | 9/2001 | Wray | 713/151 |

OTHER PUBLICATIONS

3rd Generation Partnership Project; Technical Specification Group Services and System Aspects; 3G Security; Security Architecture (Release 4); 3GPP TS 33.102 V4.3.O (Chapter 6.3), published on the Internet; Dec. 2001.

3rd Generation Partnership Project; Technical Specification Group SA3; Access security for IP-based services (Release 5); 3GPP TS 33.203 V1.0.0; Dec. 2001.

UMTS Authentication and Key Agreement; Graduate Thesis of Jon Robert Dohmen and Lars Somo Olaussen; May 2001; published on the Internet.

Public Key Infrastructure Project; published on the Internet; at least as early as Mar. 31, 2002.

Introduction to Public-Key Cryptography; p. 1-19; Graduate Thesis of Jon Robert Dohmen and Lars Somo Olaussen published on the Internet at least as early as Mar. 29, 2002.

An Introduction to IP Security (IPSec) Encryption; pubished on the Internet, at least as early as Mar. 29, 2002.

(Continued)

*Primary Examiner*—Gilberto Barron, Jr.
*Assistant Examiner*—Laurel Lashley
(74) *Attorney, Agent, or Firm*—Ware, Fressola, Van Der Sluys & Adolphson LLP

(57) ABSTRACT

A handshake protocol, for encapsulation by the so-called TLS Record Protocol, for use by a client (11) and a server (12) in authenticating each other. The handshake protocol is based on the TLS Handshake Protocol, but replaces the PKI trust infrastructure of that protocol with the IMS AKA trust infrastructure, which is based on a private key stored on a so-called smart card (11*a*) in the client terminal (11), and also stored (usually) in a Home Subscriber Server (14) serving as a trusted third party (but instead sometimes in the server (12) being authenticated), the third party providing information to the server (12) sufficient for the server (12) to authenticate the client (11) and also sufficient for the server (12) to provide to the client (11) information sufficient for the client (11) to authenticate the server (12).

14 Claims, 6 Drawing Sheets

OTHER PUBLICATIONS

The Network Access Identifier; B. Aboba, Microsoft, M. Beadles; WorldCom Advanced Networks; p. 1-6; RFC 2486 of Network Working Group published on the Internet; Jan. 1999.

The Internet Key Exchange (IKE); Network Working Group; D. Harkins, D. Carrel, Cisco Systems; RFC 2409 of the Network Working Group, Nov. 1998; published on the Internet.

The TLS Protocol, Version 1.0; RFC 2246; Network Working Group; T. Dierks, Certicom, C. Allen, Certicom; Jan. 1999; published on the Internet.

PIC, A Pre-IKE Credential Provisioning Protocol; IPSRA Working Group; Y. Sheffer, Feb. 11, 2002; published on the Internet.

* cited by examiner

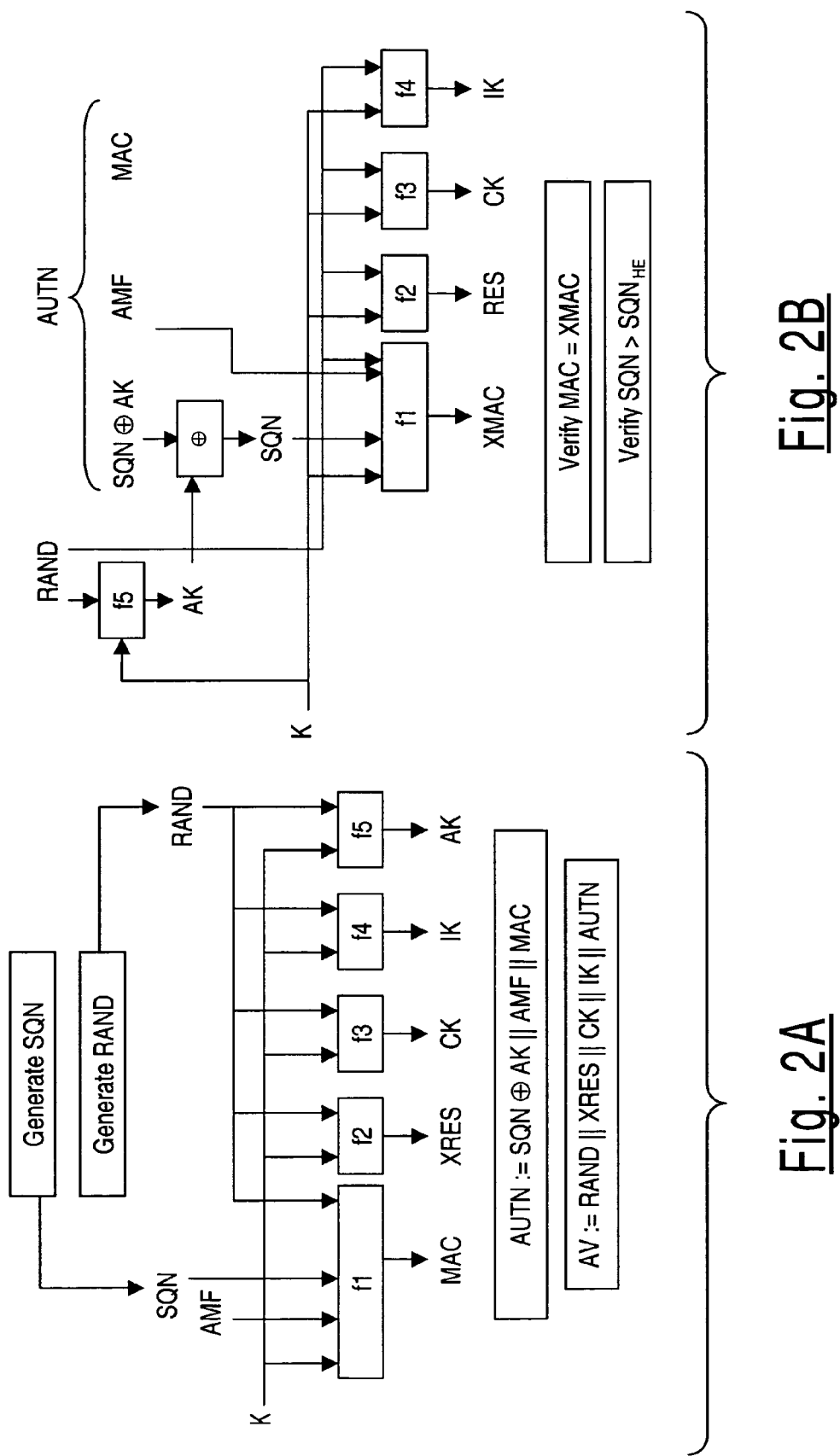

METHOD AND APPARATUS FOR PROVIDING PEER AUTHENTICATION FOR A TRANSPORT LAYER SESSION

TECHNICAL FIELD

The present invention relates to authenticating peers in a digital communication protocol, and more particularly to doing so without using a public key infrastructure.

BACKGROUND ART

According to Third Generation Partnership Project (3GPP) Technical Specification (TS) 33.203 V1.0.0 (Access Security for IP-based Services), the IMS (i.e. Internet Protocol (IP) Multimedia Core Network Subsystem or IP Multimedia Subsystem) in UMTS (Universal Mobile Telecommunications System) supports IP Multimedia applications such as conferencing using audio, video, and multimedia. 3GPP has chosen Session Initiation Protocol (SIP) as the signaling protocol for creating and terminating Multimedia sessions for wireless terminals, including mobile phones, laptop computers with a WLAN (wireless local area network) card and a USIM/ISIM (UMTS Subscriber Identity Module/IP Multimedia Private Identity), and other kinds of UE (user equipment). TS 33.203 sets out how a subscriber to IMS services is authenticated and how a subscriber authenticates the IMS, according to what is called IMS Authentication and Key Agreement (IMS AKA), which is patterned after the UMTS AKA set out in TS 33.102. (Every operator and even third parties can provide IMS services; thus not only is it necessary to authenticate that a user (i.e. the UE) is a subscriber, but it is also necessary to authenticate that the entity providing IMS services to the user is who it claims to be.)

Authentication allows each party to a communication to trust that the other is who it purports to be. A set of protocols, procedures, and associated agreements that allow communicating entities to trust that each is who it purports to be, so that keys that are used for digital signatures and encryption are genuine, is called a trust infrastructure.

All trust infrastructures ultimately rely on some information being provided "out-of-band," i.e. on some transaction not susceptible to the eavesdropping that might occur in a communication using the trust infrastructure. The out-of-band information is typically a (public) key or keys associated with an identity (the identity of the owner of the key). For enabling a UTRAN to authenticate a user and vice versa, UMTS AKA relies on a private long-term key associated with the user, i.e. associated with the UMTS Subscriber Identity Module (USIM) in the UE operated by the user. The key is provided out-of-band to the USIM in the UE (when the USIM is manufactured) and is also provided out-of-band to a so-called authorization center (AuC), a facility that is part of the home environment for the user. The identity (of the USIM) to be associated with the key is of course provided along with the key, but authentication does not rely on keeping secret the identity associated with the private key.

Similarly, IMS AKA, in providing a trust infrastructure for accessing IM services via a mobile phone, uses a private long-term key exchanged out-of-band between an ISIM (IM Services Identity Module, playing a role analogous to that played by the USIM for general UMTS services) and an IM authorization center; the key is associated with an IP Multimedia Private Identity (IMPI) provided by the manufacturer of the USIM/ISIM (not necessarily the same as the manufacturer of the wireless terminal) and stored in the ISIM. The IMPI takes the form of a Network Access Identifier (NAI) as defined in IETF (Internet Engineering Task Force) RFC 2486.

Outside of the context of accessing IM services, authentication is sometimes performed using what is called a Public Key Infrastructure (PKI) as the trust infrastructure. A PKI makes use of what are called certification authorities (CAs) to issue so-called digital Certificates; because the Certificates are issued by a CA out-of-band to entities seeking to enable others to authenticate them, it is these digital certificates that are the out-of-band component of the trust infrastructure provided by PKI. Such Certificates provide for the secure distribution of Public Keys (for use in asymmetric key encryption), which in effect authenticates the participants in a communication (since the corresponding private keys can be used to digitally sign documents), i.e. the process of securely obtaining the public key of an entity is tantamount to authenticating the entity. To provide a basis for authentication and so for serving as an element of a trust infrastructure, a Certificate is a structured document that binds the name of a participant in a communication (or similar information) to a public key (the participant's public key), and is digitally signed by a CA, acting as a trusted third party. To verify a certificate, the user of the public key (sometimes called the relying party) must first obtain the public key of the CA by some other (out-of-band) trusted means. If this is done, and if the CA is able to certify the public key of other CAs, which in turn certify other CAs and so on, then an entity relying on the (trusted) CA will be able to securely communicate with any other entity for which there is a chain of certificates between the trusted CA and the CA certifying the key of the other entity.

A PKI includes not only a sufficiently interlinked network of CAs to ensure that any relying party can verify any given certificate, but also systems to issue and store certificates, to determine their authenticity, and to revoke certificates if keys become compromised, as well as possibly other services in connection with effectively utilizing public key cryptography and digital signatures, such as a non-repudiation service and a digital notary or digital time-stamping service. All of these services must work together and have a common understanding of the formats and protocols necessary to achieve their aims. It is the collection of these components that has come to be known as a PKI.

The so-called Transport Layer Session (TLS) Protocol, described in IETF RFC 2246, provides privacy and data integrity between two communicating applications, and more specifically for a client using Web-based services provided by a server, using hypertext transport protocol (HTTP); to provide privacy and data integrity, TLS uses a PKI (i.e. a PKI trust infrastructure) for authentication. The TLS Protocol is composed of two layers: the TLS Record Protocol and the TLS Handshake Protocol. The TLS Record Protocol is the lower layer, and is itself layered on top of some reliable transport protocol, such as the Transmission Control Protocol (TCP). The TLS Record Protocol provides connection security, and is used for encapsulation of various higher level protocols, one of which is the TLS Handshake Protocol. The TLS Handshake Protocol allows a server and client in a communication session to authenticate each other and to negotiate an encryption algorithm and cryptographic keys before the application protocol transmits or receives its first byte of data. The TLS Handshake Protocol provides connection security having three basic properties: the peer's identity can be authenticated using asymmetric, or public key, cryptography (e.g., RSA, DSS, etc.); the negotiation of a shared secret is secure in that the negotiated secret is unavailable to eavesdroppers, and for any authenticated connection the secret cannot be obtained, even by an attacker who can place himself in the middle of the connection; and the negotiation is reliable in that no attacker can modify the negotiation communication without being detected by the parties to the communication.

Because a large-scale PKI has yet to be implemented, and because of the complexity of such an infrastructure, it would be advantageous to use another trust infrastructure as a basis for authentication in the TLS Handshake Protocol.

DISCLOSURE OF THE INVENTION

Accordingly, in a first aspect of the invention, a method is provided by which a client, having a secret key, authenticates a server, and vice versa, so as to be able to communicate with each other via a connection established between the client and the server, the method serving as a handshake protocol (such as the TLS Handshake Protocol) encapsulated by another protocol (such as the TLS Record Protocol) providing connection security, the method characterized by: a step in which the client sends the server a message claiming an identity of the client; and a step (or set of steps) in which authentication of both the client and the server is performed based on information derived from, but not revealing, the secret key.

In accord with the first aspect of the invention, in the step in which authentication is performed, the information derived from, but not revealing, the secret key may be determined by the client using the secret key but may be provided to the server by a third-party server distinct from the server and trusted by the server. Further, the step in which authentication is performed may in turn include: a step in which the server, in response to a message flow from the client and also in response to an authentication field and a random number field provided by the third-party server, may provide the authentication field and the random number field to the client; and a step in which the client, in response to the authentication field and the random number field, may test whether the server is authentic based on information conveyed by the authentication field and also based on the random number field. Further still, the step in which authentication is performed may also in turn include: a step in which if the client determines the server to be authentic, then the client may calculate a result field based on the secret key and the random number field. Also further still, the step in which authentication is performed may also include: a step in which the third-party server may derive the authentication field from the secret key. Also further still, the step in which authentication is performed may also include: a step in which the third-party server may send to the server a message including an expected result field; and a step in which the server may use the result field to test whether the client is authentic by comparing the result field with the expected result field.

Also in accord with the first aspect of the invention, in the step in which authentication is performed, the information derived from, but not revealing, the secret key may be determined by the client using the secret key and also by the server using the secret key.

Also in accord with the first aspect of the invention, a shared secret is obtained based on information derived from, but not revealing, the secret key.

In a second aspect of the invention, a client apparatus is provided, characterized in that it is operative according to the first aspect of the invention in respect to the client.

In a third aspect of the invention, a server apparatus is provided, characterized in that it is operative according to the first aspect of the invention in respect to the server.

In a fourth aspect of the invention, a digital communication system is provided, including a client apparatus, a server apparatus, and a third-party server apparatus, characterized in that the client apparatus, the server apparatus and the third-party server apparatus are operative according to the first aspect of the invention in respect to the client, the server, and the third-party server respectively.

In a fifth aspect of the invention, a digital communication system is provided, including a client apparatus and a server apparatus, characterized in that the client apparatus and the server apparatus are operative according to the first aspect of the invention in respect to the client and the server respectively.

BRIEF DESCRIPTION OF THE DRAWINGS

The above and other objects, features and advantages of the invention will become apparent from a consideration of the subsequent detailed description presented in connection with accompanying drawings, in which:

FIG. 2A is a schematic of the calculations performed (in a Home Subscriber Server or, sometimes, in the server) in generating an authentication vector (and providing an expected response XRES);

FIG. 2B is a schematic of the calculations performed (in an ISIM of the client, a UE) in authenticating a network (and in generating a response RES);

BEST MODE FOR CARRYING OUT THE INVENTION

To allow a server of Web-based services and a wireless terminal client, communicating via a UTRAN or other wireless radio access network (digital communication system), to authenticate each other (and then to negotiate an encryption algorithm and cryptographic keys), the invention adapts the TLS Handshake Protocol to use the trust infrastructure used in the IMS Authentication and Key Agreement (IMS AKA) protocol instead of a PKI-based protocol.

Figure 1:
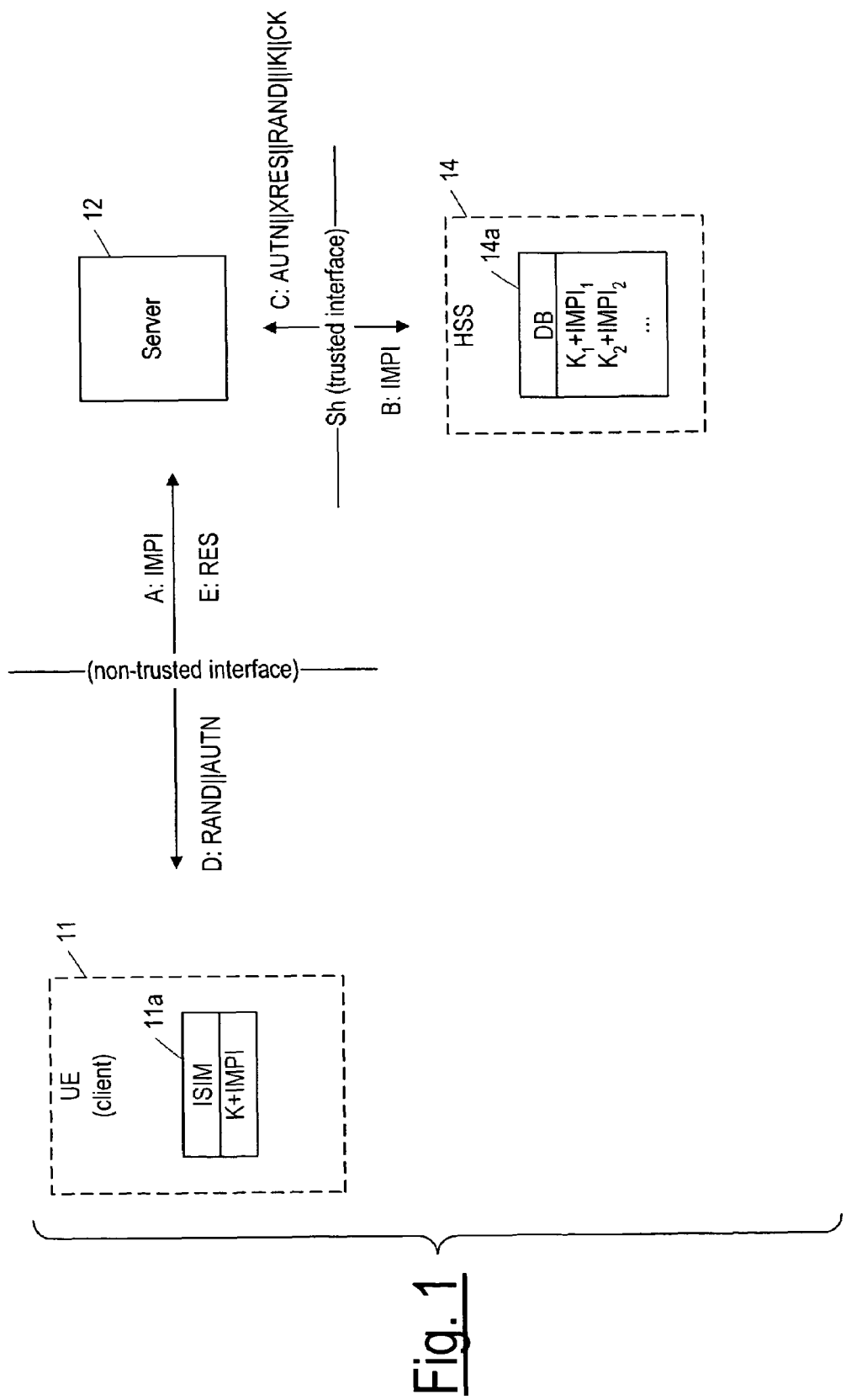
FIG. 1 is a block diagram indicating a client and a server being authenticated according to the invention and showing the basic messages being exchanged according to the IMS AKA protocol, and also according to the TLS Handshake Protocol as modified by the invention.

Referring now to FIG. 1, the IMS AKA trust infrastructure is shown being used in a TLS Handshake Protocol in a context where a client 11 has a non-trusted interface with a server 12, which in turn has a trusted interface (called the Sh interface) with a Home Subscriber Server (HSS), which hosts the master database for the client, holding the out-ofband information needed to authenticate the client. Communication between a server and the HSS is over the Sh interface according to an authentication, authorization and accounting (AAA) protocol, a system in IP-based networking to control what computer resources users have access to and to keep track of the activity of users over a network.

FIG. 1 is an excerpt of the full TLS Handshake Protocol according to the invention, called here the TLS AKA Protocol; FIGS. 3B and 3C show the full TLS AKA Protocol of the invention. FIG. 1 is also an excerpt of the TLS AKA Protocol, an excerpt of the components that the invention inserts into the TLS Handshake Protocol to arrive at the TLS AKA Protocol.

In FIG. 1, the client 11 includes, on a so-called smart card (which includes a microprocessor as well as non-volatile memory), an ISIM (IM Subscriber Identity Module) 11a that in turn includes a so-called long-term key K and an IM Private Identity (IMPI) associated with (i.e. bound to) the key K; the key K is provided out-of-band, i.e. not using the UTRAN, usually by the smart-card manufacturer at the time of manufacturing the smart card. In some embodiments, the server, unlike the client, does not include an ISIM with the shared key K, but instead obtains from the HSS information derived from the secret key K; it is information derived from the key K that is used by the server to authenticate the client and vice versa. In other embodiments, the server does include the shared key K and does not need to communicate with an HSS in order to authenticate the client. The invention is described below in the case where the server relies on an HSS to provide information derived from the secret key K, as indicated in FIG. 1, except where otherwise noted.

Still referring to FIG. 1 and also now to FIG. 2A, and following 3GPP TS 33.102, section 6, after the client indicates the need for authentication by sending its IMPI to the server, the client and server authenticate each other on the basis of the secret key K held in the client ISIM 11a without the key K ever being communicated in-band (across the radio access network). More specifically, in a message flow A, the client indicates its IMPI to the server, which then in a message flow B (that includes the IMPI of the client) requests from the HSS (for the client) what is called an authentication vector (AV), which is a concatenation of an authentication token AUTN, and expected response XRES from the client, and a random number RAND (as shown in FIG. 2A), where AUTN is itself a concatenation of fields: a sequence number SQN logically added (i.e. combined using an AND operation) to an anonymity key AK derived from the secret key K, as shown in FIG. 2A (i.e. via a function f5); an authentication and key management field AME (having values set so as to be of use for various purposes including for example to allow handling multiple authentication algorithms and keys, changing sequence number verification parameter sets, and setting threshold values to restrict the lifetime of cipher keys CK and integrity keys IK); and a message authentication code MAC also derived from the secret key K (via the function f1). (The functions f1-f5 are well-known, and are the same as are used in UIMITS AKA.) Then in a message flow C, the HSS returns the authentication vector AV (containing the AUTN, RAND, XRES, IK, and CK).

Now also referring to FIG. 2B, in a next message flow D, called an authentication request, the server 12 provides the client 11 with the random number RAND and the authentication token AUTN; the client then verifies the authentication token AUTN, as described below, and, assuming the AUTN is verified (which authenticates the server), computes a response RES (as indicated in FIG. 2B, i.e. using the function f2).

To verify the AUTN, upon receipt of RAND and AUTN the USIM first computes the anonymity key $AK=f5_K$ (RAND) and retrieves the sequence number SQN= (SQN⊕AK)⊕AK. Next the USIM computes $XMAC=f1_K$ (SQN∥RAND∥AMF) and compares this with MAC, which is included in AUTN. If they are different, the client sends user authentication reject back to the server with an indication of the cause, and the client abandons the procedure.

Next the USIM verifies that the received sequence number SQN is in the correct range. If the USIM considers the sequence number to be not in the correct range, it sends synchronization failure back to the VLR/SGSN including an appropriate parameter, and abandons the procedure. If the sequence number is considered to be in the correct range however, the USIM computes $RES=f2_K$ (RAND) and includes this parameter in a user authentication response back to the VLR/SGSN. (Finally the USIM computes the cipher key $CK=f3_K$(RAND) and the integrity key $IK=f4_K$ (RAND). Note that RES, CK and IK can also be computed earlier at any time after receiving RAND, and doing so is sometimes more efficient.)

Upon receipt of user authentication response, the server 12 compares RES with the expected response XRES provided by the HSS as part of the authentication vector. If XRES equals RES, then the client 11 is authenticated; otherwise, the server sends an Authentication Failure Report procedure to the HSS. (The server also selects the appropriate cipher key CK and integrity key IK from the selected authentication vector.)

Now, the TLS Handshake Protocol according to the prior art involves the following steps:
Exchange hello messages to agree on algorithms, exchange random values, and check for session resumption.
Exchange the necessary cryptographic parameters to allow the client and server to agree on a premaster secret.
Exchange certificates and cryptographic information to allow the client and server to authenticate themselves.
Generate a master secret from the premaster secret and exchanged random values.
Provide security parameters to the record layer.
Allow the client and server to verify that their peer has calculated the same security parameters and that the handshake occurred without tampering by an attacker.

Figure 3A:
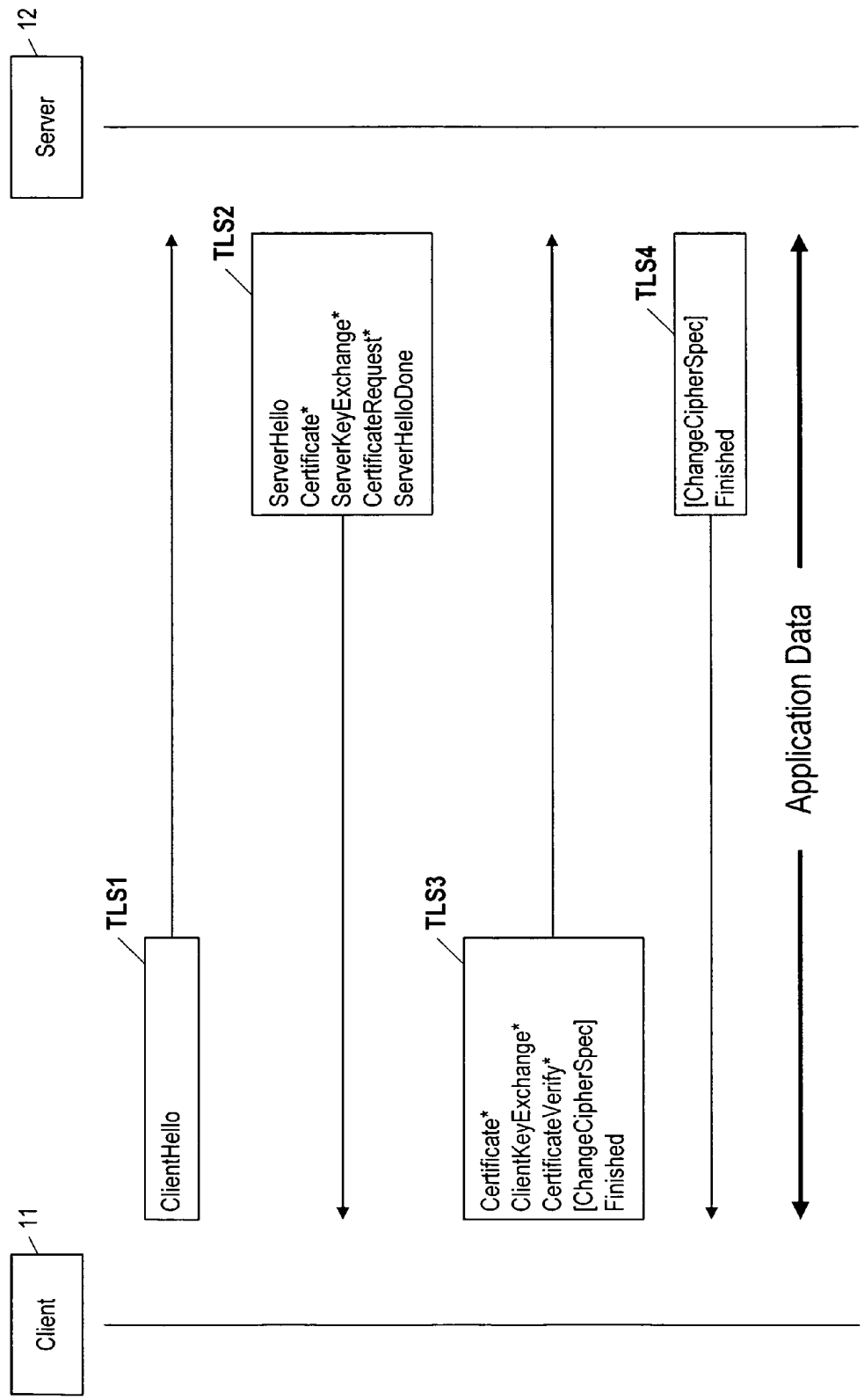
FIG. 3A is a messaging sequence diagram for the TLS Handshake Protocol, according to the prior art (using the PKI trust infrastructure)
Figure 3B:
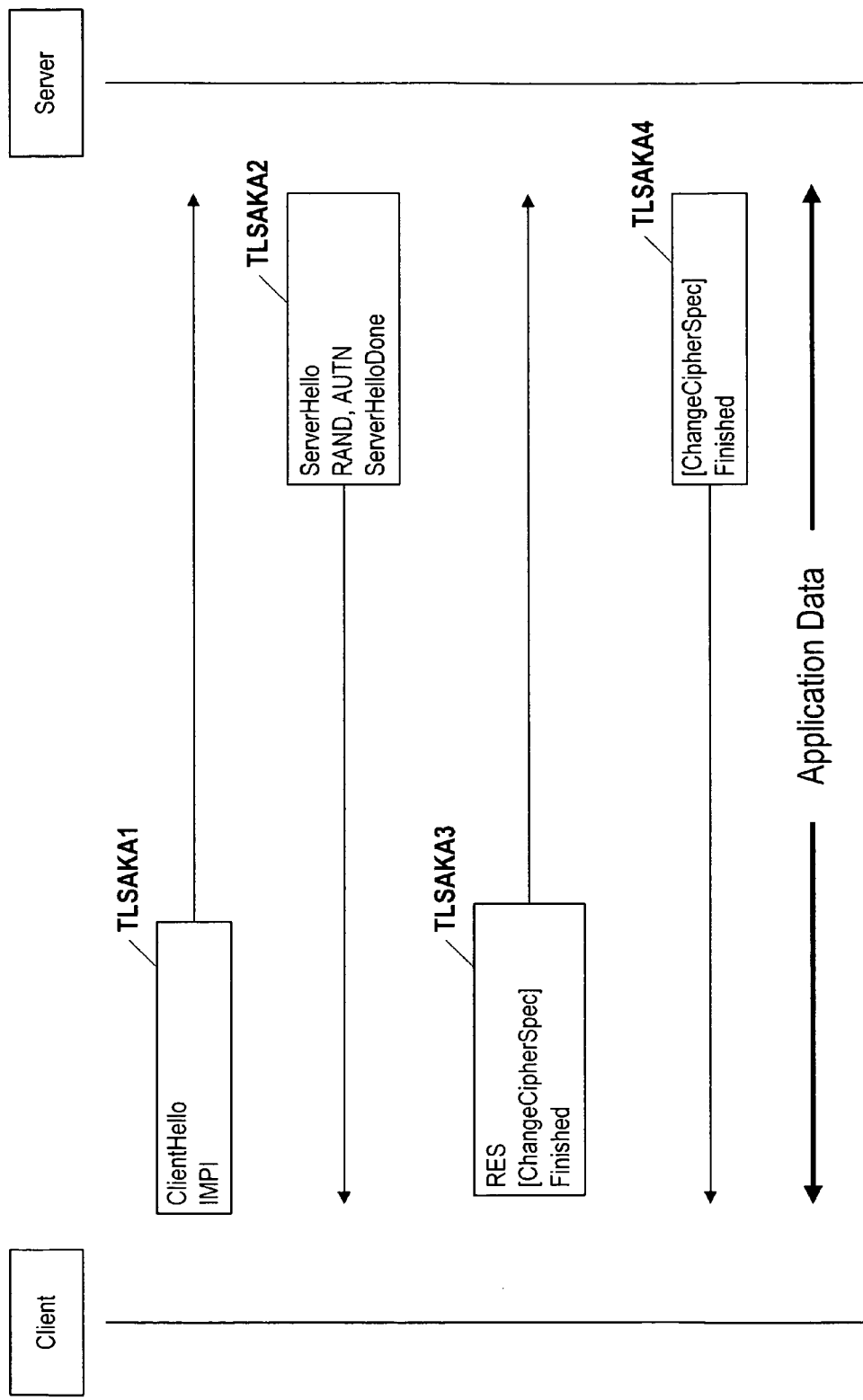
FIG. 3B is a messaging sequence diagram for the TLS AKA protocol, according to the invention, in respect to only the client and the server using the protocol.
Figure 3C:
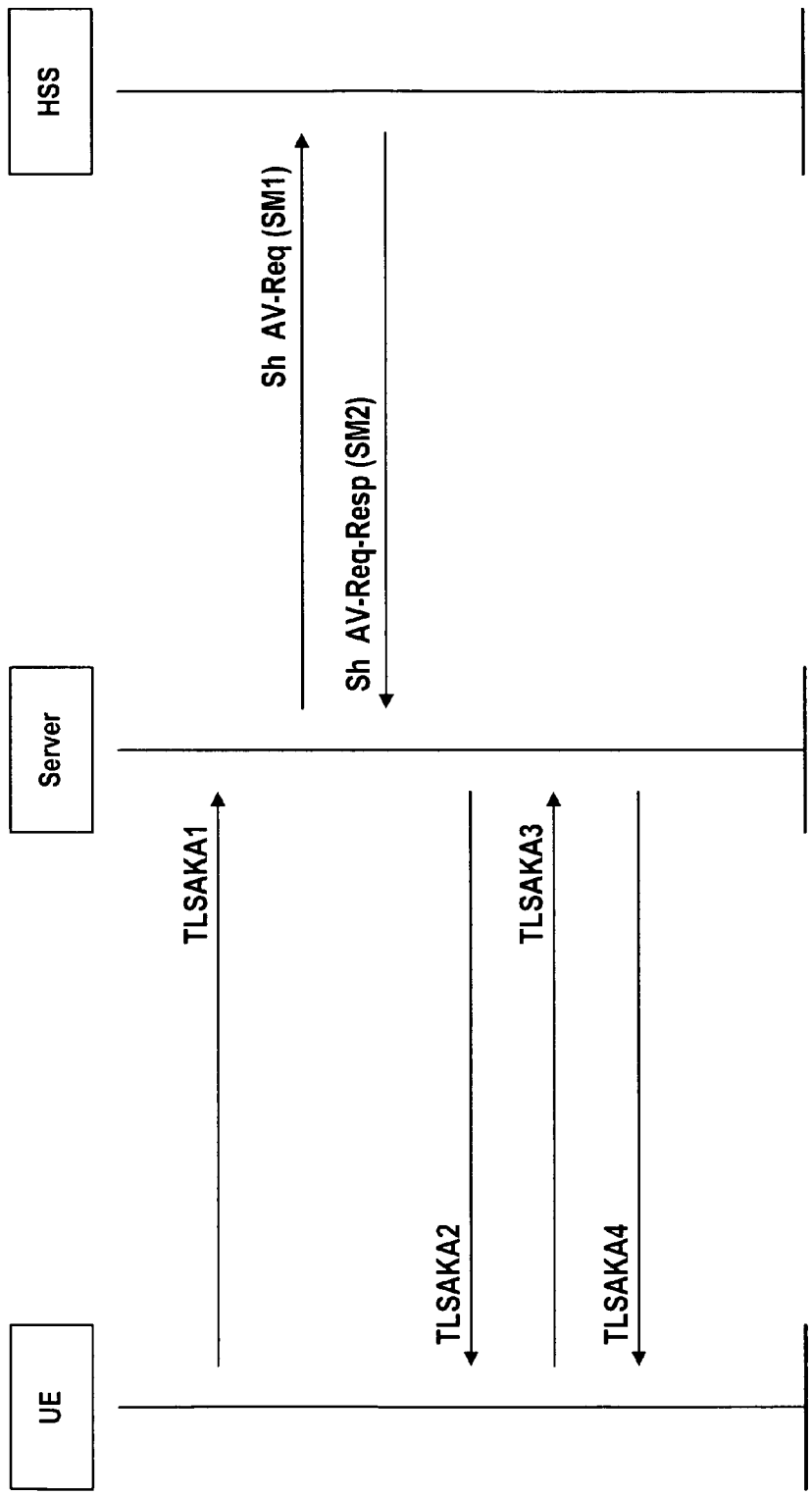
FIG. 3C is a messaging sequence diagram for the TLS AKA protocol, according to the invention, showing messaging (in some embodiments) between the server and an HSS having a copy of a secret key of the client (the secret key that is the basis for the TLS AKA trust infrastructure)

Referring now to FIG. 3A, the TLS Handshake Protocol according to the prior art (and so using a PKI trust infrastructure) is shown as a message sequence diagram, showing message flows TLS1-TLS4, each including one or more messages. The different messages of a message flow are usually transmitted separately, as described here.

The client 11 sends a client hello message (in message flow TLS1) to which the server 12 must respond with a server hello message (in message flow TLS2), or else a fatal error will occur and the connection will fail. The client hello and server hello are used to establish security enhancement capabilities between client and server. The client hello and server hello establish the following attributes: Protocol Version, Session ID, Cipher Suite, and Compression Method. Additionally, two random values are generated and exchanged: ClientHello.random and ServerHello.random.

The actual key exchange, i.e. the exchange of messages leading to a shared secret, uses up to four messages communicated between the client and the server: the server certificate and the server key exchange in message flow TLS2, and the client certificate and client key exchange in message flow TLS3. The shared secret is advisably quite long; currently defined key exchange methods exchange secrets which range from 48 to 128 bytes in length.

Following the hello messages, as part of the TLS2 message flow, the server 12 sends its certificate, if it is to be authenticated; additionally, a server key exchange message may be sent, if it is required (e.g. if the server has no certificate, or if its certificate is for signing only). If the server is authenticated, it may request a certificate from the client, if that is appropriate to the cipher suite selected.

Next, as the final message in the TLS2 message flow, the server sends the server hello done message, indicating that the hello-message phase (the TLS2 message flow) of the handshake is complete. The server then waits for a client response. If the server has sent a certificate request message, the client, in a TLS3 message flow, sends the certificate message and then the client key exchange message. The content of the client key exchange message depends on the public key algorithm selected between the client hello and the server hello. If the client sends a certificate with signing ability, a digitally-signed certificate verify message is sent to explicitly verify the certificate.

At this point, in the TLS3 message flow a change cipher spec message is sent by the client, and the client copies the pending Cipher Spec into the current Cipher Spec. The client then immediately sends the finished message under the new algorithms, keys, and secrets. In response, the server, in a TLS4 message flow, sends its own change cipher spec message, transfers the pending to the current Cipher Spec, and sends its finished message under the new Cipher Spec. This completes the handshake, and the client and server can then exchange application layer data.

Referring now to FIGS. 3B and 3C, the full TLS AKA Protocol is shown as a message sequence diagram that is the same as in the TLS Handshake Protocol with respect to the client 11 and server 12, except that the contents of the TLS1-TLS3 message flows are changed to replace the PKI trust infrastructure elements (the certificates and corresponding keys) with the IMS AKA trust infrastructure elements (which are conveyed via the IMPI, AUTN and RAND fields). In the TLS1 message flow, the IMPI is also conveyed, in addition to the Hello message. In the TLS2 message flow, the certificate message and the server key exchange message are replaced by the authentication token AUTN and RAND. In the TLS3 message flow, the certificate, client key exchange, and certificate verify messages are replaced by the response RES of IMS AKA. The modified TLS1-3 message flows are called here the TLSAKA1-3 message flows, and the TLS4 message flow, which is unchanged, is renamed the TLSAKA4 message flow when serving as a message flow of the TLS AKA Protocol.

Referring now in particular to FIG. 3C, the message flows of the TLS AKA Protocol are shown as also including message flows between the server 12 and the HSS 14, i.e. across the (well-known) Sh interface, message flows by which the HSS provide the server with the AUTN, XRES, and RAND fields (as indicated in FIG. 1). In Sh AV-Req (SM1), the SM1 message of the TLS AKA protocol as set out in 3GPP TS 33.203 (and see also 3GPP TS 33.102 for more detail) essentially communicates the IMPI of the client 11 to the HSS by way of a request for an AV (authentication vector). In response, the HSS issues an Sh AV-Req-Resp (SM2), which provides the AUTN, XRES, and RAND fields as components of an AV.

Figure 4:
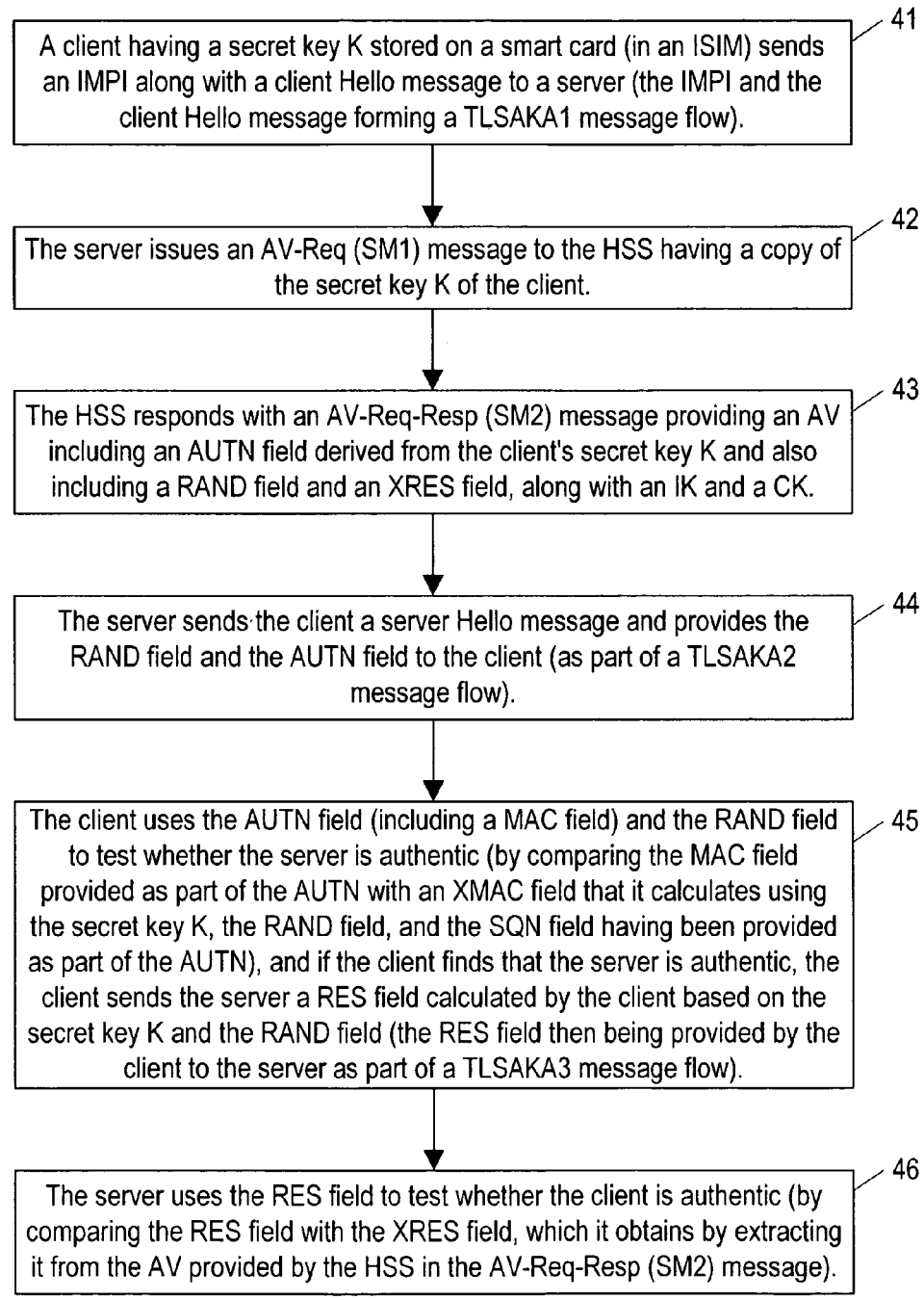
FIG. 4 is a flowchart indicating the steps of the invention (the TLS AKA protocol).

Referring now to FIG. 4, a flowchart of the TLS AKA protocol is shown as including a step 41 in which the client 11 having a secret key K stored on a smart card (in an ISIM 11a) sends an IMPI along with a client Hello message to the server 12, the IMPI and the client Hello message forming a TLSAKA1 message flow. In a next step 42, the server issues an AV-Req (SM1) message to the HSS 14 having (in a database 14a) a copy of the secret key K of the client. Next, in a step 43, the HSS responds with an AV-Req-Resp (SM2) message providing an AV including an AUTN field derived from the client's secret key K and also including a RAND field and an XRES field. In a next step 44, the server sends the client a server Hello message and provides the RAND field and the AUTN field to the client (as part of a TLSAKA2 message flow). In a next step 45, the client uses the AUTN field (including a MAC field) and the RAND field to authenticate the server (i.e. to test whether the server is authentic, by comparing the MAC field provided as part of the AUTN with an XMAC field that it calculates using the secret key K, the RAND field, and the SQN field having been provided as part of the AUTN), and if the client finds that the server is authentic, the client sends the server a RES field calculated by the client based on the secret key K and the RAND field, the RES field then being provided by the client to the server as part of a TLSAKA3 message flow. In a next step 46, the server uses the RES field to test whether the client is authentic by comparing the RES field with the XRES field that it extracts from the AV provided by the HSS in the AV-Req-Resp (SM2) message. If mutual authentication is successful (i.e. if both the client and the server are authenticated by the other), then the IK key is used as the premaster secret (i.e. the shared secret). As indicated in FIG. 2A and FIG. 2B, the IK key is derived from (or computed using) the secret key K by both the client 11 and also by either the server 12 or the HSS 14, but does not reveal the secret key K.

Discussion

The invention, providing the TLS AKA Protocol, is for use by terminals, at least one of which (the client or UE) has an ISIM card (and so is usually a 3G wireless terminal), communicating using a digital communication system and using the TLS Record Protocol. The terminal bearing the ISIM card, typically referred to as the client or UE, can be any of several kinds. In TS 33.203, the UE is a mobile terminal (MT), i.e. a cellular phone. However, other kinds of UEs can advantageously practice the invention as well, including UEs without an integral MT component, but attached to an external MT, such as a laptop computer attached to a MT or to a mobile router, or other devices that communicate with a MT. It is important to understand that the list of devices given here is not intended to be exhaustive.

The invention comprehends not only the arrangement illustrated in FIG. 1, where the HSS 14 is a third party server that is distinct from the server 12 being authenticated, but also an arrangement in which the server 12 itself has stored the long-term secret key K of the client and so performs the functions indicated above as being performed by the HSS, i.e. the determining of the authentication vector including the authentication token AUTN used to authenticate the client and vice versa. In other words the invention also comprehends an arrangement in which there is not Sh interface.

The invention is not intended to be for the use all services/applications provided by the IMS. Some of the services provided by IMS use an unreliable transport protocol, such as user datagram protocol (UDP), and some use a reliable protocol, such as TCP; the invention is intended to be used only by services that run on top of TCP.

With respect to the digital communication system in which the invention may be practiced, in TS 33.203, the communication system is the UMTS Release 5 network; however, it is clear from what has been described that the invention is also of use in other communication systems besides the UMTS Release 5 network. In particular, any third party could implement a system that is operative according to the invention. For example, the communication system could even be the Internet, and the UE could be connected to the Internet via either a wireless or a wireline connection not involving some other communication system (e.g. the connection is a simple connection to the Internet via an Internet Service Provider) or via an intermediate communication system (e.g. a mobile phone connected to the Internet via UTRAN, i.e. UMTS (Universal Mobile Telecommunications System) Terrestrial Radio Access Network).

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   a client sending a message to a server, wherein the message claims an identity associated with a shared secret key; and
   the server performing authentication of the client and conversely, based on information derived from the shared secret key but not revealing the shared secret key;
   wherein the shared secret key and the identity are provided out-of-band to both the client and at least one other entity so as to associate the identity with the shared secret key; and
   wherein the sending of the message and authentication are according to a predetermined transport layer session handshake protocol providing authentication for a transport layer session communication using a predetermined authentication and key agreement not making use of a public key infrastructure.

2. The method of claim 1, wherein in the authentication, the information derived from, but not revealing, the shared secret key is determined by the client using the shared secret key but is provided to the server by a third-party server distinct from the server and trusted by the server.

3. The method of claim 2, wherein the authentication includes:
   the server, in response to a message flow from the client and also in response to an authentication field and a random number field provided by the third-party server, providing the authentication field and the random number field to the client; and
   the client, in response to the authentication field and the random number field, testing whether the server is authentic based on information conveyed by the authentication field and also based on the random number field.

4. The method of claim 3, wherein the authentication also includes:
   the third-party server deriving the authentication field from the shared secret.

5. The method of claim 3, wherein the authentication also includes:
   the third-party server sending to the server a message including an expected result field; and
   the server using the result field to test whether the client is authentic by comparing a result field received from the client with the expected result field.

6. The method of claim 1, wherein the authentication also includes:
   if the client determines the server to be authentic, then the client calculating a result field based on the shared secret key and the random number field.

7. The method of claim 1, wherein in the authentication, the information derived from, but not revealing, the shared secret key is determined by the client using the secret key and also by the server using the shared secret key.

8. The method of claim 1, wherein a shared secret is obtained based on information derived from, but not revealing, the shared secret key.

9. A client apparatus, operative according to the method of claim 1 in respect to the client.

10. A server apparatus, operative according to the method of claim 1 in respect to the server.

11. A server apparatus, operative according to the method of claim 2 in respect to the server.

12. A digital communication system including a client apparatus, a server apparatus, and a third-party server apparatus, wherein the client apparatus, the server apparatus and the third-party server apparatus are operative according to the method of claim 2 in respect to the client, the server, and the third-party serve respectively.

13. A digital communication system including a client apparatus and a server apparatus, wherein the client apparatus and the server apparatus are operative according to the method of claim 1 in respect to the client and the server respectively.

14. A method as in claim 1, wherein the information is also derived from a random number and a sequence number using a predetermined set of functions.

* * * * *

UNITED STATES PATENT AND TRADEMARK OFFICE
CERTIFICATE OF CORRECTION

| | | |
|---|---|---|
| PATENT NO. | : 7,246,236 B2 | Page 1 of 1 |
| APPLICATION NO. | : 10/127339 | |
| DATED | : July 17, 2007 | |
| INVENTOR(S) | : Vlad Alexandru Stirbu | |

It is certified that error appears in the above-identified patent and that said Letters Patent is hereby corrected as shown below:

1. In column 10, line 14, claim 4, line 4, after "secret", insert --key--.

Signed and Sealed this

Twenty-ninth Day of April, 2008

JON W. DUDAS
*Director of the United States Patent and Trademark Office*